No. 820,456. PATENTED MAY 15, 1906.
H. J. WESSINGER.
LATCH OPERATING MECHANISM FOR DREDGES.
APPLICATION FILED JAN. 22, 1906.
2 SHEETS—SHEET 1.
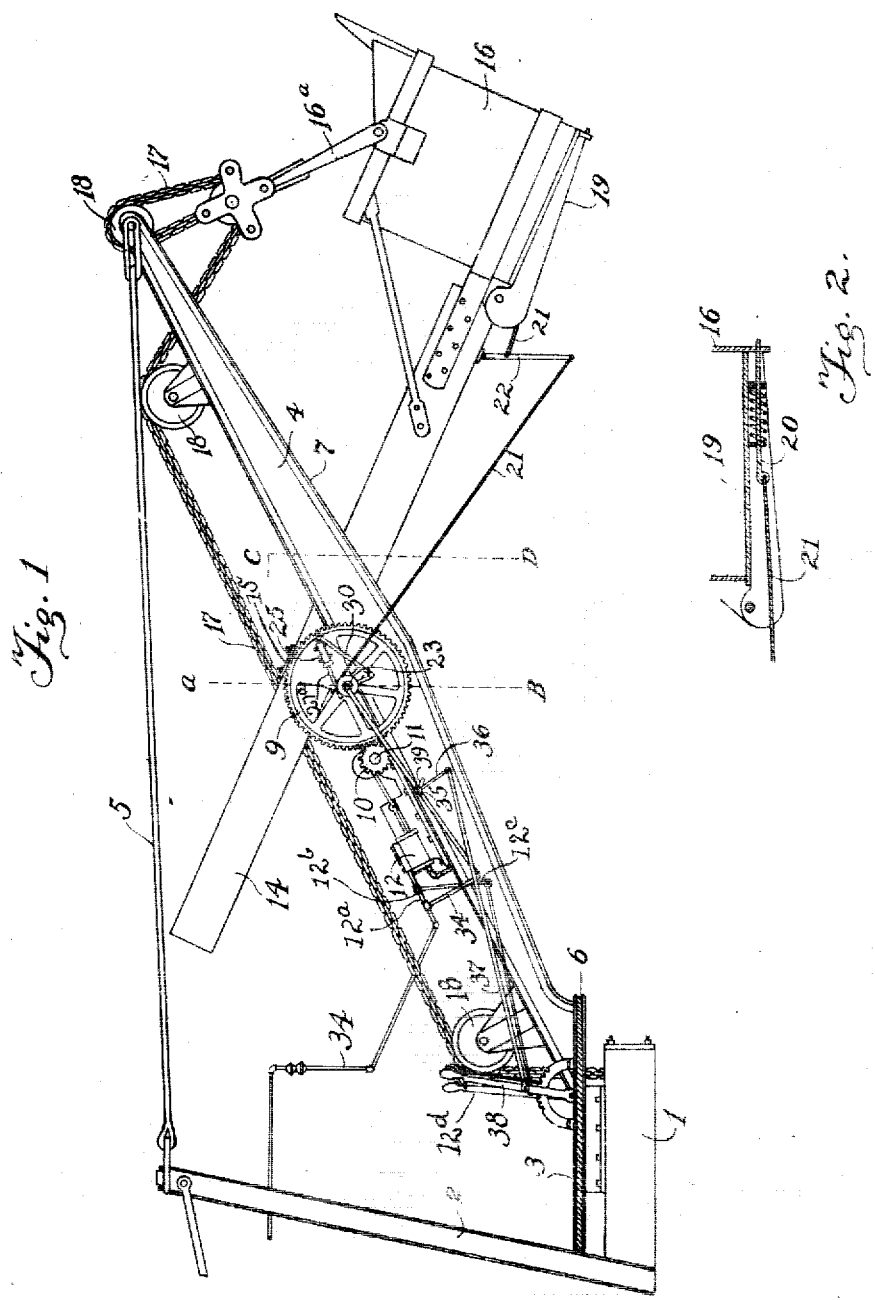
WITNESSES:
W. H. Smallwood
Pearl Martin
INVENTOR.
Henry J. Wessinger
BY
James T. Watson
ATTORNEY.

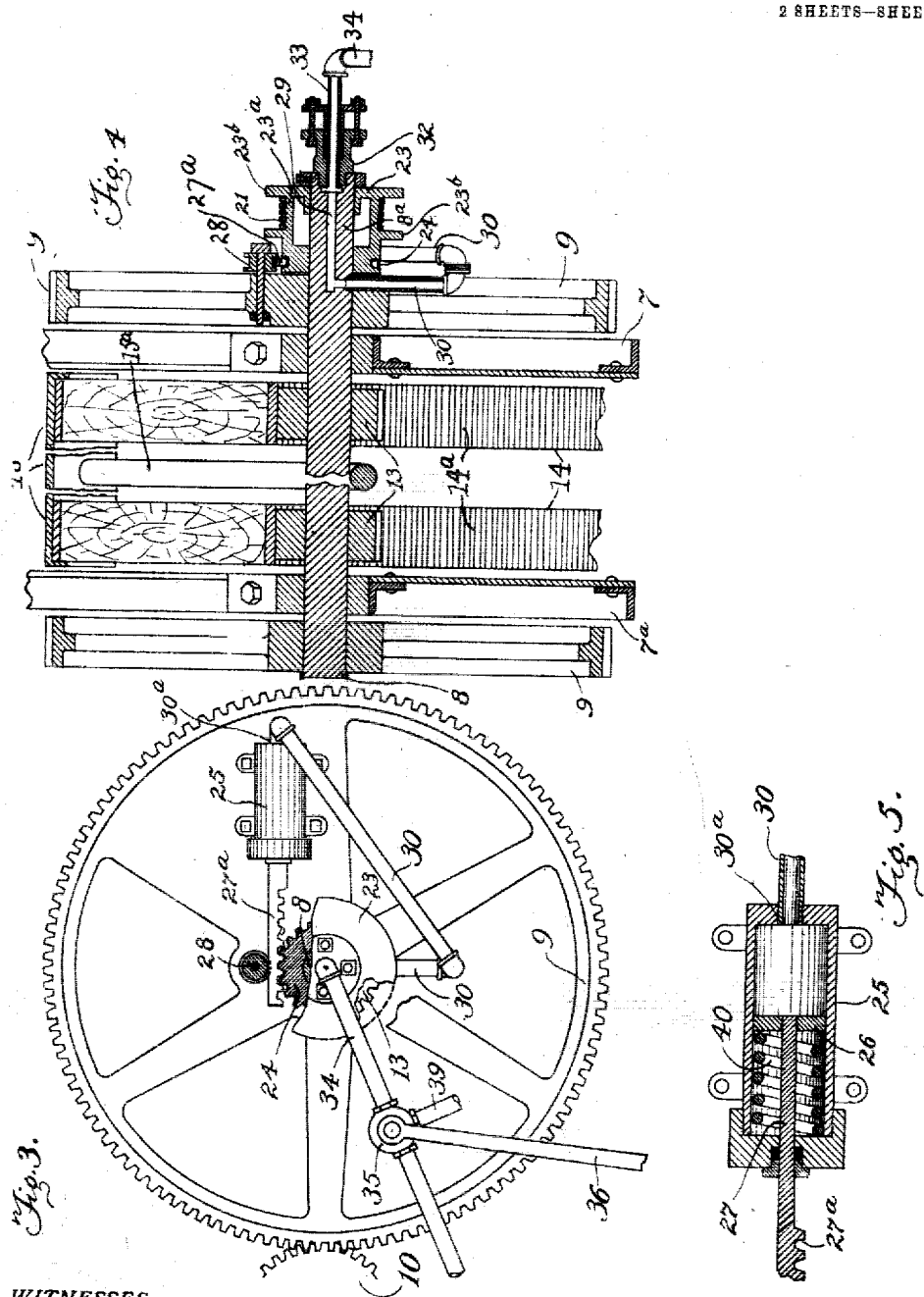

UNITED STATES PATENT OFFICE.

HENRY J. WESSINGER, OF DULUTH, MINNESOTA.

LATCH-OPERATING MECHANISM FOR DREDGES.

No. 820,456.   Specification of Letters Patent.   Patented May 15, 1906.

Application filed January 22, 1906. Serial No. 297,224.

*To all whom it may concern:*

Be it known that I, HENRY J. WESSINGER, a citizen of the United States, residing at Duluth, in the county of St. Louis and State of Minnesota, have invented certain new and useful Improvements in Latch-Operating Mechanism for Dredges; and I do hereby declare the following to be a full, clear, and exact description of the invention, such as will enable others skilled in the art to which it appertains to make and use the same.

My invention relates to latch-operating mechanism for dredges and power-shovels, and has for its object the provision of means for drawing the latch-line of the shovel or dipper-trap for emptying the load.

It has for a further object the provision of means for automatically lengthening or shortening the operation of the latch-line, according to the varying distance of the dipper or shovel beyond the fulcrum of the dipper-handle.

With these and other objects in view it consists of the constructions, combinations, and arrangements of parts hereinafter shown and described.

In the drawings, Figure 1 is a side elevation of a portion of a power-shovel or dredge, showing my invention mounted thereon. Fig. 2 is a detail vertical longitudinal section of one form of a shovel-trap and of the latch for controlling the position of the same. Fig. 3 is an enlarged side elevation, partly broken away, of a part of said shovel or dredge, showing a portion of my invention mounted thereon. Fig. 4 is an enlarged vertical section on the line A B of Fig. 1 looking forward, the part forward of the line C D being omitted, showing a portion of my said invention. Fig. 5 is an enlarged detail vertical longitudinal sectional view of the cylinder and piston forming part of my said invention.

In the drawings, 1 is a portion of the platform of a dredge or shovel car or scow, upon which car or scow support is erected the A-frame 2. Upon said platform is mounted in any suitable manner a turn-table 3, upon which is erected a dipper-supporting boom 4. The outer end of said boom is supported from said A-frame by the guy 5. The turn-table is preferably rotated by the cable 6. Said boom preferably consists of the parallel members 7 and 7ª, held in parallelism in any suitable manner, which manner or means, it is thought, need not be especially described, as such booms are in common use and well known to the art. Mounted in any suitable bearings on said boom is a shaft 8, to which is keyed a gear or gears 9, adapted to be rotated by a pinion or pinions 10, which pinions are keyed to a crank-shaft 11, mounted in suitable bearings on said boom. The shaft 11 is rotated by any suitable power, as by an engine 12, mounted on said boom. Said engine is connected in any suitable manner, as by pipes 12ª and 34, with a suitable source of power-supply, as to a steam-boiler or compressed-air reservoir (not shown) supported on said car or scow. A suitable throttle-valve 12ᵇ may be interposed in the line of said pipe 12ª and governed by a series of levers, as 12ᶜ 12ᵈ, from an operating-stand on said turn-table. Keyed to said shaft 8 is a pinion or pinions 13. Resting upon or against said pinions 13 is a dipper-handle 14, extending between the members 7 and 7ª and provided on its lower face with rack-teeth 14ª, adapted to engage the teeth of said pinion or pinions 13. The dipper-handle is held in engaging position with said pinions 13 by a saddle-plate 15, extending across the upper face of said dipper-handle and adapted to slide longitudinally thereon and secured to said shaft 8 by a U bolt or bolts 15ª. Carried by said dipper-handle at its outer end is a dipper 16, having a suitable bail or means of attachment 16ª for a hoisting-cable or chain 17, which chain passes over any suitable idler-wheels 18, mounted on said boom, and thence in any suitable direction and guided by any suitable means to a hoisting-engine, (not shown,) preferably mounted on said car or scow. Said dipper or shovel is provided with a trap 19, through which the load may be discharged, and said trap is adapted to be held in closed position by a latch or spring-bolt of any suitable construction, as 20. The spring-bolt is adapted to be drawn by a latch line or lines 21, which, if desired, may be divided and one end of the latch or bolt connected portion attached to a lever 22 intermediate of the ends thereof, and one end of the other portion may be attached to the free end of said lever. The lever 22 is in such case pivoted or hinged at its other end to said dipper-handle.

The construction thus far described is old in the art and in common use in the same or more or less modified forms, and I therefore make no claim to the same *per se*. Heretofore, however, it has been customary to draw said latch-line manually at the expense of considerable labor, notwithstanding the aid in some cases of said lever 22, and, further, it has been customary to leave sufficient slack in the latch-line to permit of the extension of nearly the full length of the dipper-handle beyond its fulcrum without accidentally drawing the latch. When the dipper-handle was extended only for a part of its extreme reaching distance, this excessive slack in the latch-line would have to be taken up before the latch could be drawn. The adjustment of the length of the latch-line to various conditions thus required considerable time and labor. My invention consists, in combination with the devices of the broad class described or modifications of them, of means for automatically lengthening or shortening the latch-line to conform to the reach of the dipper and for operating said latch-line when desired to draw the dipper-latch. For this purpose I construct the shaft, as 8, with an outwardly-extending portion 8$^a$, upon which I mount the loose drum 23 of any suitable construction, preferably having a helical groove 23$^a$ cut in its periphery and preferably, also, having flanges 23$^b$ formed thereon. On one end of said drum is secured or formed a pinion 24. Upon the side of one of the gears 9 I attach a cylinder 25, inclosing a piston 26, to which piston is attached a piston-rod 27, extending through one end of said cylinder and carrying a rack 27$^a$ on its outer end adapted to engage the pinion 24. Upon the side of said gear 9, above the rack 27$^a$, is preferably mounted a small roller 28, adapted to prevent the disengagement of said rack from said pinion, though such disengagement would not be apt to occur even if said roller were not used. Extending axially into the end 8$^a$ of the shaft 8 is a tunnel 29, having a transverse branch at or near its inner end, which branch extends through the shaft 8 radially in one direction from the tunnel 29. Inserted and secured in the outer end of said branch is a pipe connection 30, which extends in any suitable course toward the outer end of said cylinder 25, into which cylinder the opposite end of said pipe connection penetrates, as at 30$^a$, and is adapted to discharge. The outer end of said tunnel 25 is preferably enlarged and is adapted to receive the inner end of a suitable stuffing-box 32, which is secured therein. A nipple 33, preferably flanged at its inner end, is passed loosely through said stuffing-box, and secured to the outer end of said nipple is a pipe connection 34, extending to a suitable source of power-supply, as to a steam-boiler or compressed-air reservoir, (not shown,) but preferably mounted on the platform of said car or scow. Interposed in said pipe connection 34 is a suitable valve, preferably a three-way valve 35, of any suitable construction, adapted to be operated by a lever 36, draw-rod 37, and hand-lever 38. Said cylinder may be provided with any suitable exhaust device within the scope of my invention; but I prefer that the valve 35 shall be a three-way valve, in which case the valve-casing is provided with an exhaust-port 39, governed by the valve. The mode of operation of the valve will readily occur to any one skilled in the art, since such valves are common. In one position of the valve the exhaust will be closed, and steam will flow from the boiler to the cylinder 25. In the other position of the valve the live steam will be cut off, and the exhaust-steam will return from the cylinder 25 and escape through the port 39. The piston is thus adapted to be operated in one direction by steam. It is preferably operated in the opposite direction by a coiled spring 40, interposed between the piston and that end of the cylinder which is penetrated by the rod 27. In my invention the latch-line is secured at one end to and partly wound upon the drum 23 between said flanges, enough line being wound upon the drum to suffice for all occasions. The other end of the line is then attached to the latch directly or through the medium of the lever, as heretofore described; but little or no slack is allowed in the line.

In operation to draw the latch the valve 35 is operated to admit steam to the cylinder 25, which steam forces the piston backward in opposition to the spring and causes the rack 27$^a$ to revolve the drum 23, by which the latch-line is wound in and the latch drawn. The valve 35 is then operated to open the exhaust and cut off the live steam from the cylinder, and the piston is returned to the outer end of the cylinder by the back spring 40. This causes a reverse rotation of the drum 23, which pays out the latch-line. If now it be desired to extend or shorten the reach of the dipper, the engine 12 is operated ahead or reversed, as the case may be, thus through intermediate means, including the gears 9, heretofore described, rotating the pinions 13, which reciprocate the dipper-handle. In this movement it will be observed the gear 9, carrying the cylinder 24, will rotate or turn some distance, and since the drum 23 will be locked by the rack 27$^a$ said drum will turn with the gear 9 and pay out or wind up the latch-line in the same proportion as the dipper is extended beyond its fulcrum or retracted toward it. To this end the winding-face of the drum 23 is or is intended to be about the same diameter as the pinions 13.

If desired, electromotive equivalents (not shown) may be substituted within the scope of my invention for the steam or air operated engines which I have described.

While I have described a dipper dredge or shovel, I desire to be understood as including any other forms of dredges or other hoisting apparatuses to which my invention may be conveniently applied.

Having now described my invention, what I claim is—

1. In a latch-operating mechanism, the combination with a dredge, or analogous hoisting apparatus, having a boom, a dipper or load-containing device carried thereby, a latch or draw bolt on said dipper or device, and a line for retracting said latch or bolt, of a shaft mounted on said boom, a wheel mounted on said shaft, a motor carried by said wheel, a loose winding-drum attached to said line and mounted on said shaft, means governed by said motor and connecting said motor to said drum and adapted when at rest to hold said drum in stationary relation to said wheel and when in independent motion with relation to said wheel to turn said drum independently of said wheel, and means adapted to rotate said wheel in either direction.

2. In latch-operating mechanism, the combination, with a hoisting apparatus having a boom, a load-containing device carried thereby, a latch or draw bolt carried by said device, and means including a line for retracting said latch or bolt, of a shaft mounted on said boom, a wheel mounted on said shaft, a motor carried by said wheel, a loose winding-drum attached to said line and mounted on said shaft, means governed by said motor and connecting said motor to said drum and adapted when at rest to hold said drum in stationary relation with respect to said wheel, and adapted when in independent motion with relation to said wheel to turn said drum independently of said wheel, and means adapted to rotate said wheel in either direction, or to prevent the rotation thereof, as desired.

3. In latch-operating mechanism, the combination with a dredge or analogous apparatus, having a boom, a shaft mounted thereon, a load-gathering device provided with a handle supported on said shaft, a latch or draw bolt carried by said device, a line for retracting said latch or bolt, a gear-wheel on said shaft and adapted to rotate the same, and means for operating said gear, of a loose drum mounted on said shaft and connected to said line, a pinion loosely mounted on said shaft and adapted to turn said drum, a motor carried by said gear, and a rack engaging said pinion and adapted to be operated by said motor.

4. In latch-operating mechanism, the combination with a dredge or analogous hoisting apparatus, having a boom, a load-gathering device provided with a handle, a latch or draw bolt on said device, and a line for retracting said latch or bolt, of a shaft, mounted on said boom and having an axial tunnel formed therein at one end, said tunnel connecting at its inner end with a radially-extending tunnel formed in said shaft; a winding-drum, provided with a pinion at one end, loosely mounted on said shaft, said drum being connected with said line; a gear mounted on said shaft, and adapted to rotate the same; means adapted to operate said gear intermittently; a motor carried by said gear; a rack adapted to be operated by said motor intermittently, and engaging said pinion; a pipe connection from said radially-extending tunnel to said motor; a stuffing-box secured in the outer end of said axial tunnel; a nipple extending through said stuffing-box; a pipe connection from said nipple to a source of power-supply; a power-supply-governing valve interposed in the latter said pipe connection; and means adapted to operate said valve.

In testimony whereof I hereunto affix my signature in presence of two witnesses.

HENRY J. WESSINGER.

Witnesses:
JAMES T. WATSON,
S. S. RUMSEY.